US00RE49257E

(19) United States
(12) Reissued Patent
Artioli

(10) Patent Number: US RE49,257 E
(45) Date of Reissued Patent: Oct. 25, 2022

(54) GRIP APPARATUS FOR EXERCISE EQUIPMENT AND METHOD FOR MAKING THEREOF

(71) Applicant: ORBITAL ROTATION ACCESSORY INTERNATIONAL INC., Montréal (CA)

(72) Inventor: Vezio Artioli, Montréal (CA)

(73) Assignee: ORBITAL ROTATION ACCESSORY INTERNATIONAL INC., Montréal (CA)

(21) Appl. No.: 17/096,946

(22) Filed: Nov. 12, 2020

Related U.S. Patent Documents

Reissue of:
(64) Patent No.: 10,124,207
Issued: Nov. 13, 2018
Appl. No.: 15/577,437
PCT Filed: May 30, 2016
PCT No.: PCT/CA2016/050609
§ 371 (c)(1),
(2) Date: Nov. 28, 2017
PCT Pub. No.: WO2016/191867
PCT Pub. Date: Dec. 8, 2016

U.S. Applications:
(60) Provisional application No. 62/167,931, filed on May 29, 2015.

(51) Int. Cl.
*A63B 21/00* (2006.01)
*A63B 21/072* (2006.01)
(Continued)

(52) U.S. Cl.
CPC ..... *A63B 21/4035* (2015.10); *A63B 21/072* (2013.01); *A63B 21/0722* (2015.10);
(Continued)

(58) Field of Classification Search
CPC ..... A63B 21/0628; A63B 21/0125; A63B 21/0724; A63B 21/0722; A63B 21/4035;
(Continued)

(56) References Cited

U.S. PATENT DOCUMENTS 1,333,005 A 3/1920 Warner
3,384,370 A * 5/1968 Bailey ..... A63B 21/0724 482/106
(Continued)

FOREIGN PATENT DOCUMENTS

CN 203736796 7/2014
CN 204121675 1/2015

OTHER PUBLICATIONS

Body Gym Equipements—Gymnetic, "360 Degree biceps/triceps bar with swivel", published on Feb. 25, 2015. (The year of publication is sufficiently earlier than the effective U.S. filing date so that the particular month of publication is not an issue).
(Continued)

*Primary Examiner* — Terrence R Till
(74) *Attorney, Agent, or Firm* — Bereskin & Parr LLP/S.E.N.C.R.L., s.r.l.

(57) ABSTRACT

The present disclosure relates to a grip apparatus for exercise equipment, the grip apparatus comprising: a first annular member having a first annular sidewall and a first flange extending radially inwardly from the first annular sidewall; a second annular member having a second annular sidewall and a second flange extending radially [inwardly] *outwardly* from the second annular sidewall, a diameter of the second annular sidewall being less than a diameter of the first annular sidewall, the second annular member being positioned within the first annular member whereby the first annular sidewall, the second annular sidewall, the first flange and the second flange define together an annular chamber; a handle member connected to the second annular sidewall; and a bearing in the annular chamber, the first annular sidewall frictionally engaging a first race of the bearing and the second annular sidewall frictionally engaging a second race of the bearing.

20 Claims, 12 Drawing Sheets

AMENDED

(51) Int. Cl.
*A63B 21/062* (2006.01)
*A63B 21/012* (2006.01)
*A63B 23/035* (2006.01)
*A63B 71/06* (2006.01)

(52) U.S. Cl.
CPC ..... *A63B 21/0724* (2013.01); *A63B 21/4049* (2015.10); *A63B 21/0125* (2013.01); *A63B 21/0628* (2015.10); *A63B 21/4043* (2015.10); *A63B 23/03525* (2013.01); *A63B 2071/0694* (2013.01); *A63B 2209/02* (2013.01)

(58) Field of Classification Search
CPC . A63B 21/4049; A63B 21/4043; A63B 22/00; A63B 2071/0694
USPC ..... 248/57, 58
See application file for complete search history.

(56) References Cited

U.S. PATENT DOCUMENTS 4,629,184 A 12/1986 Selkee
4,768,778 A 9/1988 Thomas, Jr.
4,822,035 A 4/1989 Jennings et al.
5,024,434 A 6/1991 Smith ..... A63B 21/0724 482/106
5,080,349 A 1/1992 Vittone
5,211,616 A 5/1993 Riley, Jr.
5,334,113 A 8/1994 Roepke
5,718,654 A 2/1998 Kennedy
6,022,300 A 2/2000 Hightower
6,652,420 B2 11/2003 Chen
7,094,182 B1 8/2006 Holten
7,094,186 B2 * 8/2006 Diakonov et al. . A63B 21/0724 482/104
D535,336 S 1/2007 Diakonov et al.
7,238,147 B2 7/2007 Mills et al.
7,862,486 B1 1/2011 Watson
D671,996 S 12/2012 Wierszewski
8,485,948 B2 7/2013 Cen
8,549,854 B2 10/2013 Dion et al.
8,602,951 B2 12/2013 Morris
8,636,630 B2 1/2014 Morris
8,672,815 B1 3/2014 Springer
8,800,528 B2 8/2014 Fuqua et al.
8,820,294 B2 9/2014 Fuqua et al.
8,845,500 B2 9/2014 Huang
8,870,723 B2 10/2014 Morris
9,004,387 B2 4/2015 Hiraoka
2003/0207740 A1 11/2003 Fenelon et al.
2004/0082448 A1 4/2004 Martin
2005/0085352 A1 4/2005 Baxter
2005/0187079 A1 8/2005 Diakonov et al.
2005/0202942 A1 9/2005 De Lano
2008/0176723 A1 7/2008 Johnson
2012/0028770 A1 2/2012 Barchi
2012/0115688 A1 5/2012 Cen
2013/0035218 A1 2/2013 Wierszewski
2013/0059696 A1 3/2013 Hijmans et al.
2013/0193700 A1 * 8/2013 Walden ..... A01B 1/02 294/58
2013/0260969 A1 * 10/2013 Huang ..... A63B 23/03525 482/122
2014/0151483 A1 6/2014 Hiraoka
2017/0100628 A1 * 4/2017 Wilt ..... A63B 23/03533
2021/0077853 A1 * 3/2021 Martin, Sr. ..... A63B 21/4035

OTHER PUBLICATIONS

English Translation—Machine Generated of CN203736796U, "Burn Machine", published on Jul. 30, 2014.
Burn Machine LLC, "The Universal Barbell", [online], [retrieved on Dec. 18, 2012]. Retrieved from the Internet <URL:http://theburnmachine.com/the-universal.html>.
English Abstract of WO2011137556(A1), "Physical training device comprising a central movable weight and having variable handling options", published on Nov. 10, 2011.
English Translation—Machine Translation of CN204121675(U), "Arm exerciser structure", published on Jan. 28, 2015.
Pumphouse Fitness Systems, "Specialty training Bars", [online], [retrieved on Nov. 9, 2017]. Retrieved from the Internet <URL:http://pumphousefitness.com/SPECIALTY%20TRAINING%20BARS.html>, published on Nov. 7, 2011.

* cited by examiner

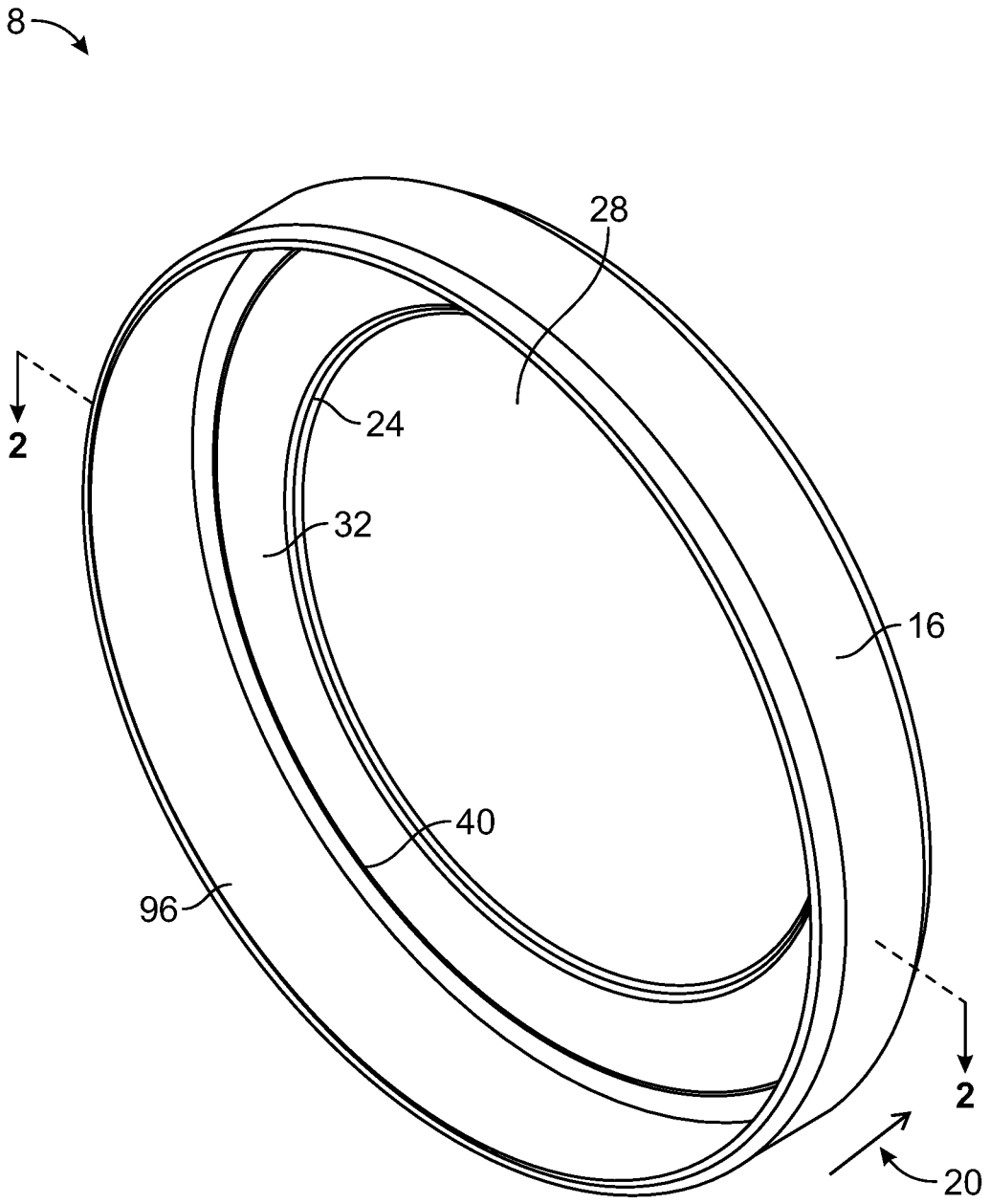
FIG. 1
AMENDED

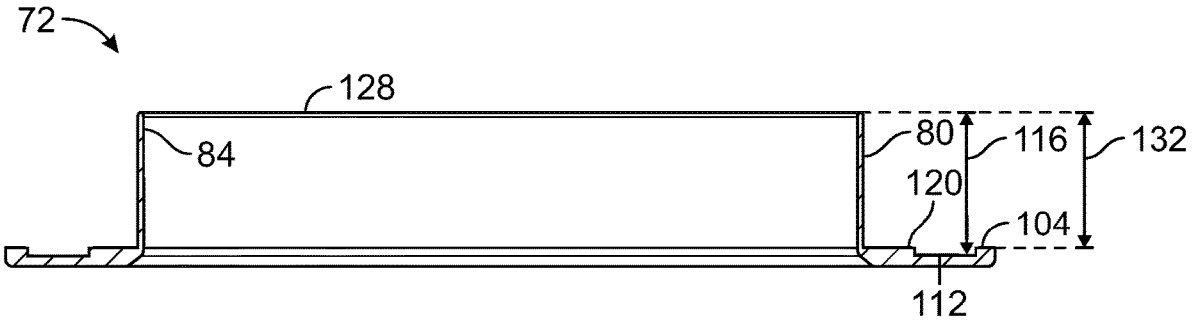
FIG. 5
AMENDED

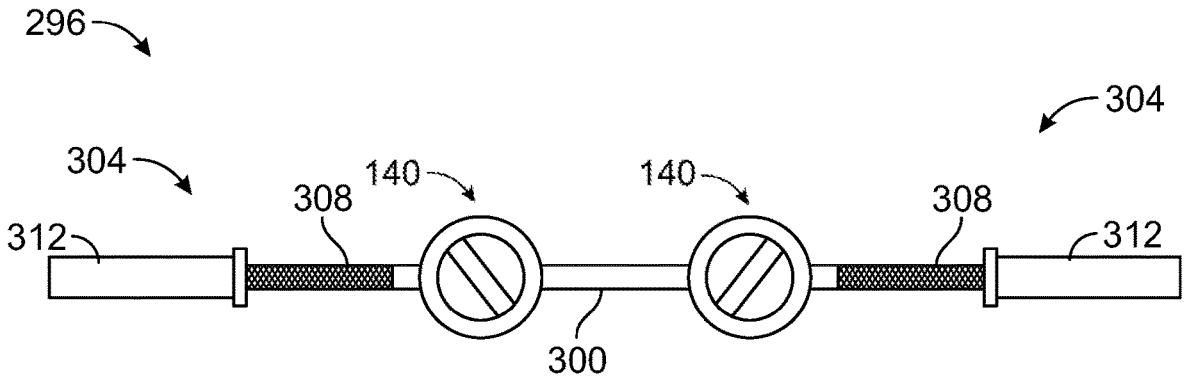
FIG. 13
AMENDED

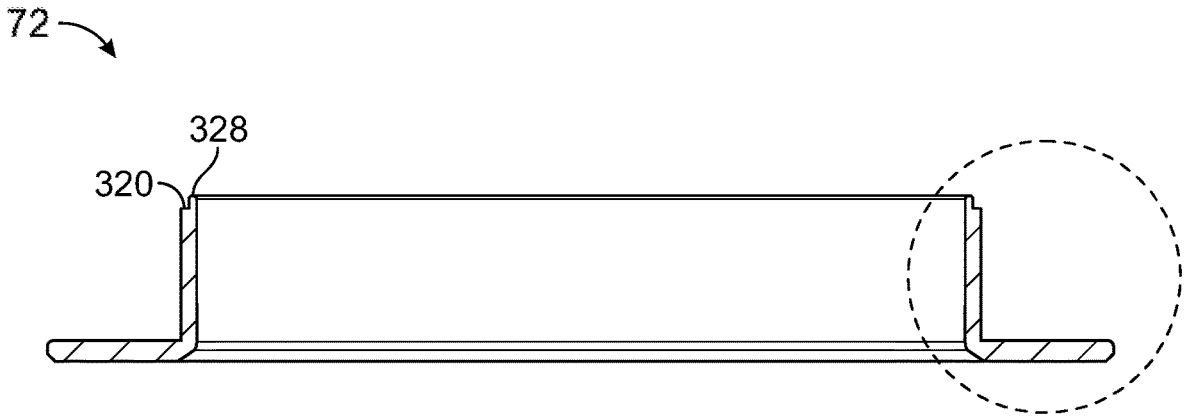
FIG. 14
AMENDED
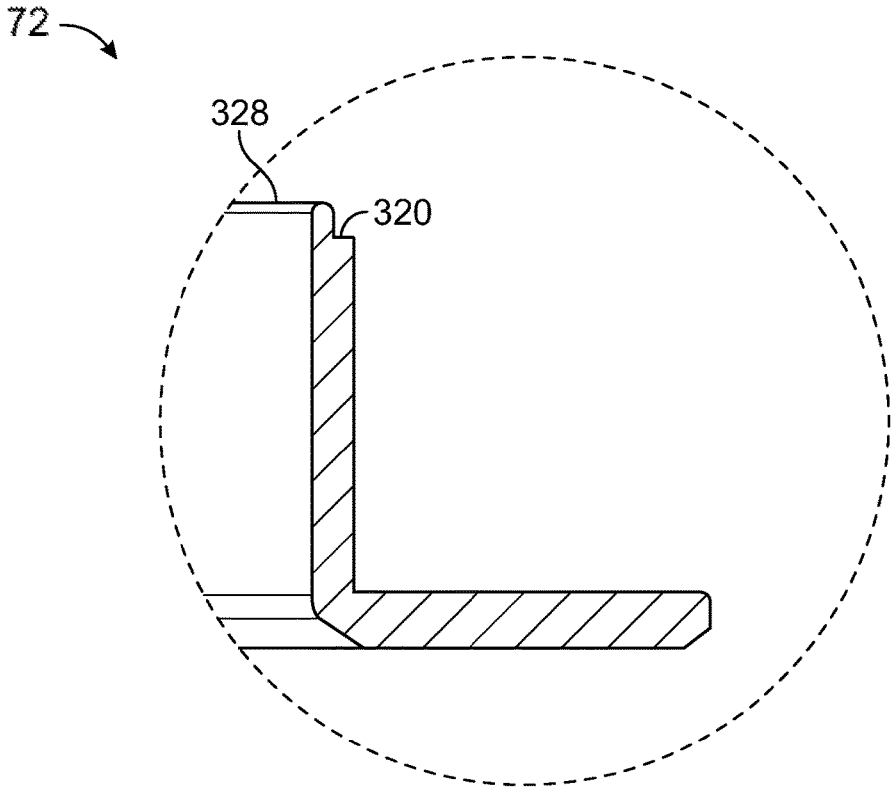
FIG. 15
AMENDED

GRIP APPARATUS FOR EXERCISE EQUIPMENT AND METHOD FOR MAKING THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is *a reissue application of U.S. patent application Ser. No. 15/577,437, filed on Nov. 28, 2017 and issued as U.S. Pat. No. 10,124,207 on Nov. 13, 2018, which is* an 35 USC 371 national stage entry of PCT/CA2016/050609 filed on May 30, 2016 which claims priority on U.S. 62/167,931 filed on May 29, 2015. These documents are hereby incorporated by reference in their entirety.

FIELD OF THE DISCLOSURE

The present disclosure relates to a grip apparatus for exercise equipment and a method for making thereof, and in particular, a grip apparatus having a freely rotatable handle.

BACKGROUND OF THE DISCLOSURE

Various types of exercise equipment, especially weight lifting equipment, provide a grip for a user to hold. Such grips are typically stationary, which may cause user discomfort or limit the user's ability to maximize his or her workout.

SUMMARY

It would thus be highly desirable to be provided with an apparatus, system or method that would at least partially address the disadvantages of the existing technologies.

The embodiments described herein provide in one aspect a grip apparatus for exercise equipment, the grip apparatus comprising a first annular member having a first annular sidewall and a first flange extending radially inwardly from the first annular sidewall, a second annular member having a second annular sidewall and a second flange extending radially [inwardly] *outwardly* from the second annular sidewall, a diameter of the second annular sidewall being less than a diameter of the first annular sidewall, the second annular member being positioned within the first annular member whereby the first annular sidewall, the second annular sidewall, the first flange and the second flange define together an annular chamber, a handle member extending between opposing portions of the second annular sidewall and a bearing positioned within the annular chamber, the first annular sidewall frictionally engaging a first race of the bearing and the second annular sidewall frictionally engaging a second race of the bearing, whereby the second annular member is freely rotatable relative to the first annular member.

The embodiments described herein provide in another aspect a grip apparatus for exercise equipment, the grip apparatus comprising: a first annular member having a first annular sidewall and a first flange extending radially inwardly from the first annular sidewall. The apparatus also comprises a second annular member having a second annular sidewall and a second flange extending radially [inwardly] *outwardly* from the second annular sidewall, a diameter of the second annular sidewall being less than a diameter of the first annular sidewall, the second annular member being positioned within the first annular member whereby the first annular sidewall, the second annular sidewall, the first flange and the second flange define together an annular chamber; a handle member connected to the second annular sidewall; and a bearing positioned within the annular chamber, the first annular sidewall frictionally engaging a first race of the bearing and the second annular sidewall frictionally engaging a second race of the bearing, whereby the second annular member is freely rotatable relative to the first annular member.

The embodiments described herein provide in another aspect an exercise equipment comprising at least one grip apparatus for exercise equipment as described herein according to various exemplary embodiments and one attachment member connected to the first annular member and adapted to be connected to a weight system.

The embodiments described herein provide in yet another aspect a method for manufacturing a grip apparatus for exercise equipment, the method comprising: providing a first annular member having a first annular sidewall and a first flange extending radially inwardly from the first annular sidewall, providing a second annular member having a second annular sidewall and a second flange extending radially inwardly from the second annular sidewall, a diameter of the second annular sidewall being less than a diameter of the first annular sidewall, attaching a handle member to opposing portions of the second annular sidewall, inserting a bearing into the first annular member, whereby an inner surface of the first annular member frictionally engages an outer surface of the bearing; and inserting the second annular member into the bearing, whereby an outer surface of the second annular member frictionally engages an inner surface of the bearing.

DRAWINGS

The following drawings represent non-limitative examples in which:

FIG. 1 illustrates a perspective view of a first annular member according to one exemplary embodiment;

FIG. 5 illustrates a section view of the exemplary second annular member along the line 5-5 of FIG. 4;

FIG. 13 illustrates a side elevation view of an exemplary Olympic bar having an exemplary grip apparatus;

FIG. 14 illustrates a section view of an initially formed second annular member according to one exemplary embodiment; and FIG. 15 illustrates a close-up view of the section encircled by dotted lines of the exemplary initially formed second annular member.

DESCRIPTION OF VARIOUS EMBODIMENTS

Figure 2:
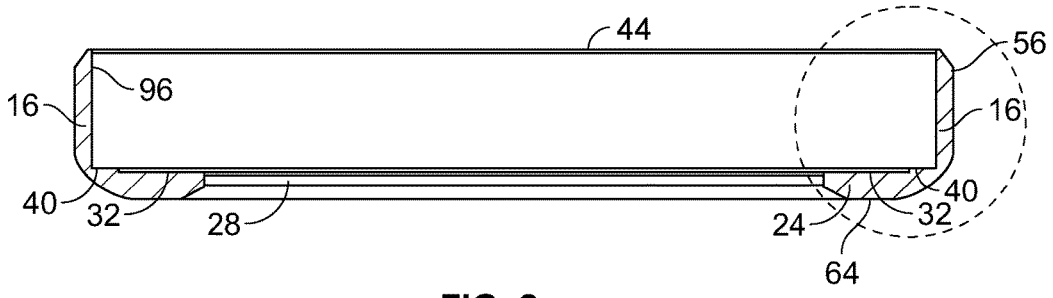
FIG. 2 illustrates a section view of the exemplary first annular member along the line 2-2 of FIG. 2.

The following examples are presented in a non-limiting manner.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices are directly connected to one another or connected to one another through one or more intermediate elements or devices via an electrical element, electrical signal or a mechanical element depending on the particular context.

According to example grip apparatuses disclosed herein the first race is an outer race of the bearing, the second race is an inner race of the bearing, and an inner surface of the first annular sidewall frictionally engages the outer race of the bearing and the second race frictionally engages the inner race of the bearing.

According to example grip apparatuses disclosed herein, the inner surface of the first annular sidewall is press fit against the outer race of the bearing.

According to example grip apparatuses disclosed herein, the outer surface of the second annular sidewall is press fit against the inner race of the bearing.

According to example grip apparatuses disclosed herein, the second annular member is swaged against the inner race.

According to example grip apparatuses disclosed herein, a diameter of the inner race corresponds with a diameter of the outer surface of the second annular sidewall within a tolerance of approximately ±0.0015 inch.

According to example grip apparatuses disclosed herein, a diameter of the outer race corresponds with a diameter of the inner surface of the first annular sidewall within a tolerance of approximately ±0.0015 inch.

According to example grip apparatuses disclosed herein, a difference between the diameter of the inner surface of the first annular sidewall and the diameter of the outer surface of the second annular sidewall substantially corresponds to a radial width of the first annular flange.

According to example grip apparatuses disclosed herein, a difference between the diameter of the inner surface of the first annular sidewall and the diameter of the outer surface of the second annular sidewall substantially corresponds to a radial width of the second annular flange.

According to example grip apparatuses disclosed herein, a top wall of the bearing abuts against the first annular flange of the first annular member.

According to example grip apparatuses disclosed herein, a bottom wall of the bearing abuts against the second annular flange of the second annular member.

According to example grip apparatuses disclosed herein, wherein the first annular flange has an annular recessed portion for accommodating portions of balls of the bearing protruding from a top wall of the bearing.

According to example grip apparatuses disclosed herein, the second annular flange has an annular recessed portion for accommodating portions of balls of the bearing protruding from a bottom wall of the bearing.

According to example grip apparatuses disclosed herein, the handle member is welded to the second annular sidewall of the second annular member.

According to example grip apparatuses disclosed herein, the grip apparatus can be free of fastening systems for attaching the first annular member to the second annular member.

According to example grip apparatuses disclosed herein, the bearing is a ball bearing.

According to example grip apparatuses disclosed herein, the bearing is chosen from a rolling element bearing, rotational bearing, a thrust bearing, a spherical bearing, a thrust bearing, a needle bear, a cam follower, a cup and cone bearing and individual ball bearings.

According to example grip apparatuses disclosed herein, the bearing is formed of a material chosen from at least one of carbon, steel, chromium steel, bronze, oil impregnated bronze, plastic, nylon based resins, graphite filled, UHMW, acetal resin, PTFE, engineered plastics, phenolic resin and wood.

According to example exercise equipment disclosed herein, the weight system is chosen from weight plates and cabled weight system.

According to example exercise equipment disclosed herein, the strength equipment is chosen from chinning triangle, a tricep press down, a lat bar, a stirrup handle, a pulldown bar, a curl bar, an Olympic bar, dumbbell handle, a hex bar, and a tricep bar.

According to example methods disclosed herein, the inner surface of the first annular member is pressfit against the outer race of the bearing and the outer surface of the second annular member is pressfit against the inner race of the bearing.

According to example methods disclosed herein, the method further includes swaging the inner surface of the second sidewall of the second annular member outwardly radially.

According to example methods disclosed herein, the handle member is welded to the second annular sidewall and the method further includes after welding the handle member, machining the outer surface of the second annular sidewall to a diameter substantially corresponding to an inner diameter of the inner race.

Figure 3:
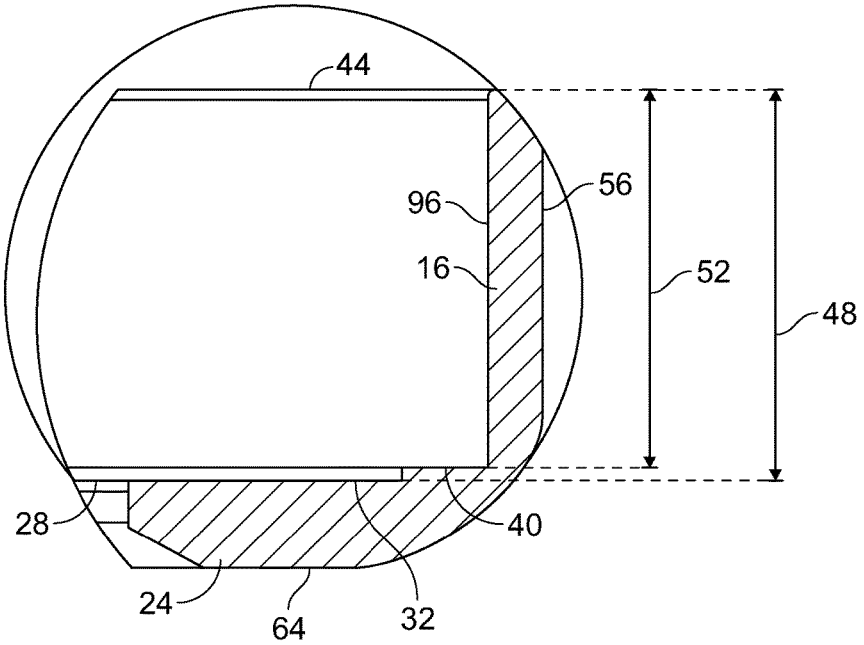
FIG. 3 illustrates a close-up view of the section encircled by dotted lines in FIG. 2 of the exemplary first annular member.

Referring now to FIGS. 1, 2 and 3 simultaneously, therein illustrated is a perspective view, section view along the line 2-2 and close-up view of the encircled section of FIG. 2 (see FIG. 3), respectively, of a first annular member 8 according to one exemplary embodiment. The first annular member 8, which may have a generally cupped shape having a bottom opening, includes an annular sidewall 16. The annular sidewall 16 extends circumferentially and in a generally axial direction 20 of the first annular member 8. The first annular member 8 further includes a flange 24 extending radially inwardly from the annular sidewall 16. As shown in FIG. 2, the annular flange 24 extends transversely to the annular sidewall 16. The annular flange 24 defines an opening 28 of the first annular member 8.

It will be understood that although the flange 24 of the first annular member 8 is illustrated in FIG. 1 to extend continuously and circumferentially, in other exemplary embodiments of the first annular member 8, the flange 24 may be formed of discontinuous portions positioned angularly about an axis of the first annular member 8.

According to various exemplary embodiments, and as illustrated in FIGS. 1 to 3, the flange 24 may have a recessed portion 32 and a raised portion 40. Compared to the raised portion 40, the recessed portion 32 has a greater depth 48 from a top 44 of the first annular member 8 than the depth 52 of the raised portion 40.

For example, and as illustrated, both the recessed portion 32 and the raised portion 40 extend continuously and circumferentially.

According to various exemplary embodiments, an outer surface 56 of the annular sidewall 16 and outer surface 64 of the flange 24 may have rounded corners so as to provide a more pleasing visual appearance. The rounded corners may also be used to identify the first annular member 8.

The first annular member 8 may be formed of a material that is susceptible to be easily machined and welded. For example, the first annular member 8 can be formed of a low carbon steel.

Figure 4:
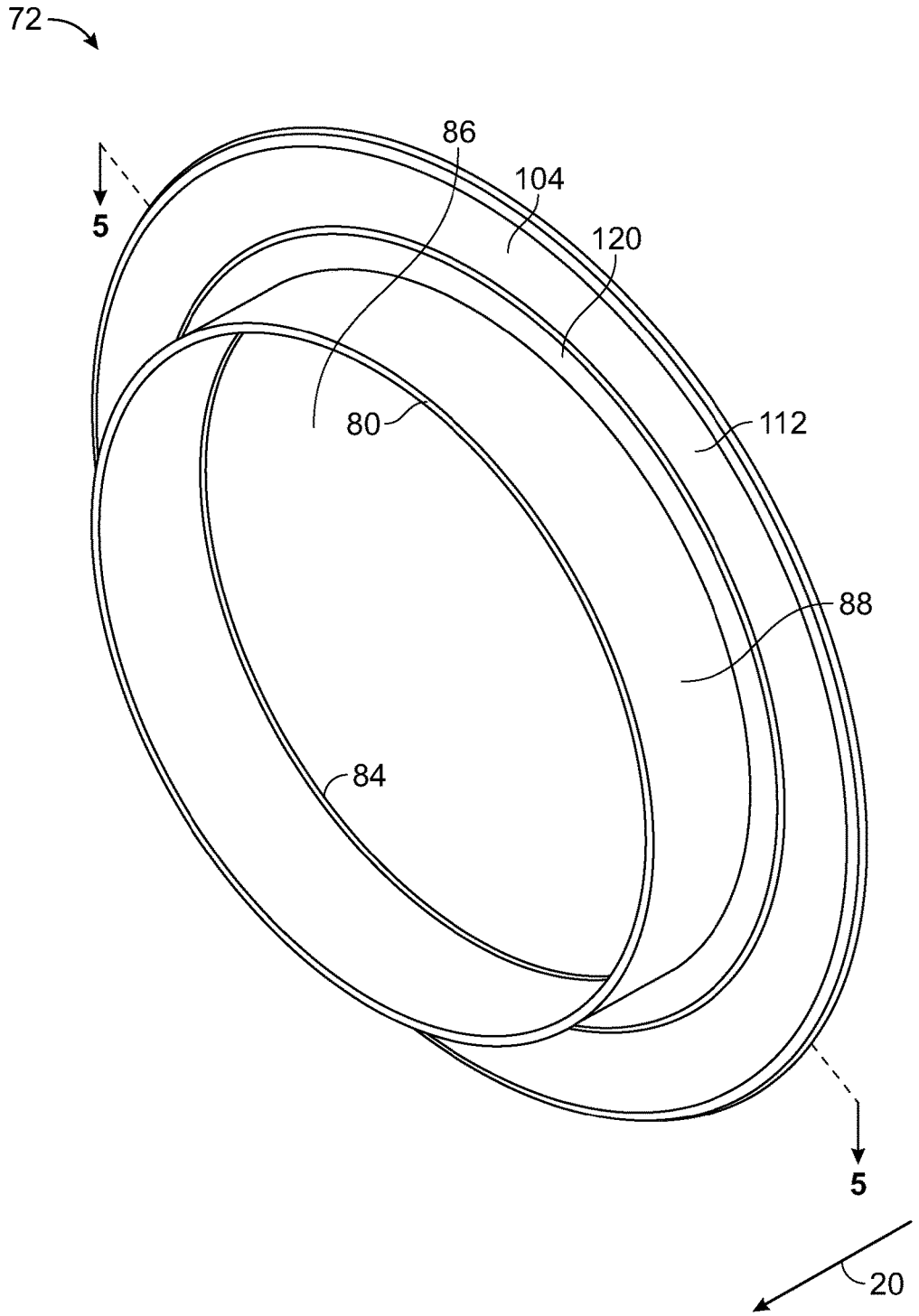
FIG. 4 illustrates a perspective view of a second annular member according to one exemplary embodiment.

Referring now to FIGS. 4 and 5 simultaneously, therein illustrated is a perspective view and a section view along the line 5-5 respective of a second annular member 72 according to one exemplary embodiment. The second annular member 72 includes an annular sidewall 80. The annular sidewall 80 extends circumferentially and in a generally axial direction 20 of the second annular member 72. The inner surface 84 of the annular sidewall 80 defines an opening 86 of the second annular member 72. For example, the diameter of the second annular member 72 may be substantially equal to the opening 28 of the first annular member 8. For example, the diameter of the second annular member 72 may be smaller than the opening 28 of the first annular member 8.

The diameter of the annular sidewall 80 is smaller than the diameter of the annular sidewall 16 of the first annular member 8. For example, the difference between the diameter of an outer surface 88 of the annular sidewall 80 of the second annular member 72 and inner surface 96 of the annular sidewall 16 of the first annular member 8 can be between about 0.5 inches to about 2 inches.

The second annular member 72 further includes a flange 104 extending outwardly from the annular sidewall 80. As shown in FIG. 5, the annular flange 104 extends transversely to the annular sidewall 80.

It will be understood that although the flange 104 of the second annular member 72 is illustrated in FIG. 5 to extend continuously and circumferentially, in other exemplary embodiments of the second annular member 72, the flange 104 may be formed of discontinuous portions positioned angularly about an axis of the second annular member 72.

According to various exemplary embodiments, and as illustrated in FIGS. 4 and 5, the flange 104 of the second annular member 72 may have a recessed portion 112 and a raised portion 120. Compared to the [recessed] *raised* portion 120, the recessed portion 112 has a greater depth 116 from a top 128 of the second annular member 72 than the depth 132 of the raised portion. For example, and as illustrated, both the recessed portion 112 and the raised portion *120* extend [120] continuously and circumferentially.

The second annular member 72 may be formed of a material that is susceptible to be easily machined and welded. For example, the second annular member 72 is formed of a low carbon steel.

A handle member 136 (FIG. 6) extends between opposing portions of the inner surface 84 of the annular sidewall 80 of the second annular member 72. The handle member 136 has dimensions corresponding to the diameter of a typical exercise handle used in the art. For example the handle has a length of about 4 inches to about 6 inches and a diameter of about 0.8 inches to about 1.5 inches. An outer surface of the handle member 136 may be knurled to provide easier gripping of the handle member 136.

For example, the handle member 136 may be connected to the annular sidewall 80 using suitable fastening systems known in the art, such as, welding, rivets, nuts and bolts, and/or screws.

For example, the handle member 136 may be connected to the annular sidewall 80 by welding ends of the handle member 136 to the opposing portions of the inner surface 84 of the annular sidewall 80.

Figure 6A:
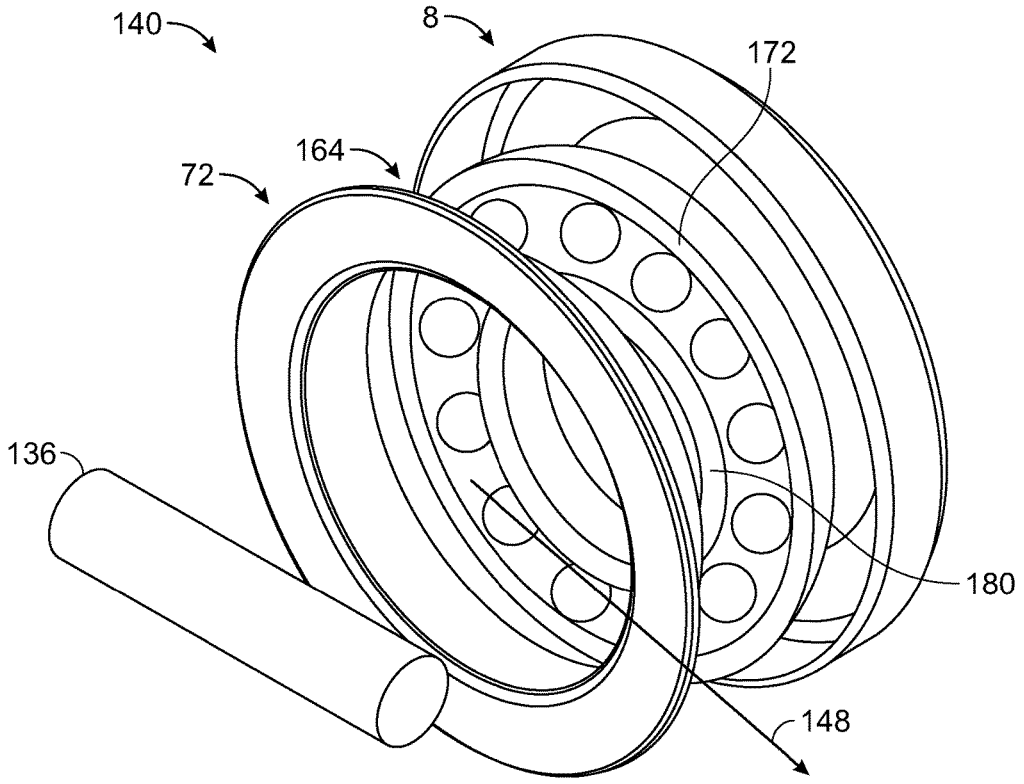
FIG. 6A illustrates a perspective exploded view of a grip apparatus according to one exemplary embodiment.

Referring now to FIG. 6A, therein illustrated is a perspective exploded view of a grip apparatus 140 according to one exemplary embodiment. The handle member 136 is positioned so as to be connected to the annular sidewall 80 of the second annular member 72. The second annular member 72 is further positioned so that its annular sidewall 80 is extending towards the flange 24 of the first annular member 8. The second annular member 72 is inserted into to the first annular member 8 so that a top 128 of the second annular member 72 is positioned proximate the flange 24 of the first annular member 8. Similarly, a top 48 of the first annular member 8 is positioned proximate the flange 104 of the second annular member 72. Furthermore, in this position, the annular sidewall 80 of the second annular member 72 overlaps with the annular sidewall 16 of the first annular member 8 in a radial direction 148 of the grip apparatus 140. The opening 28 of the first annular member 8 is axially aligned with the opening 86 of the second annular member 72.

Figure 6B:
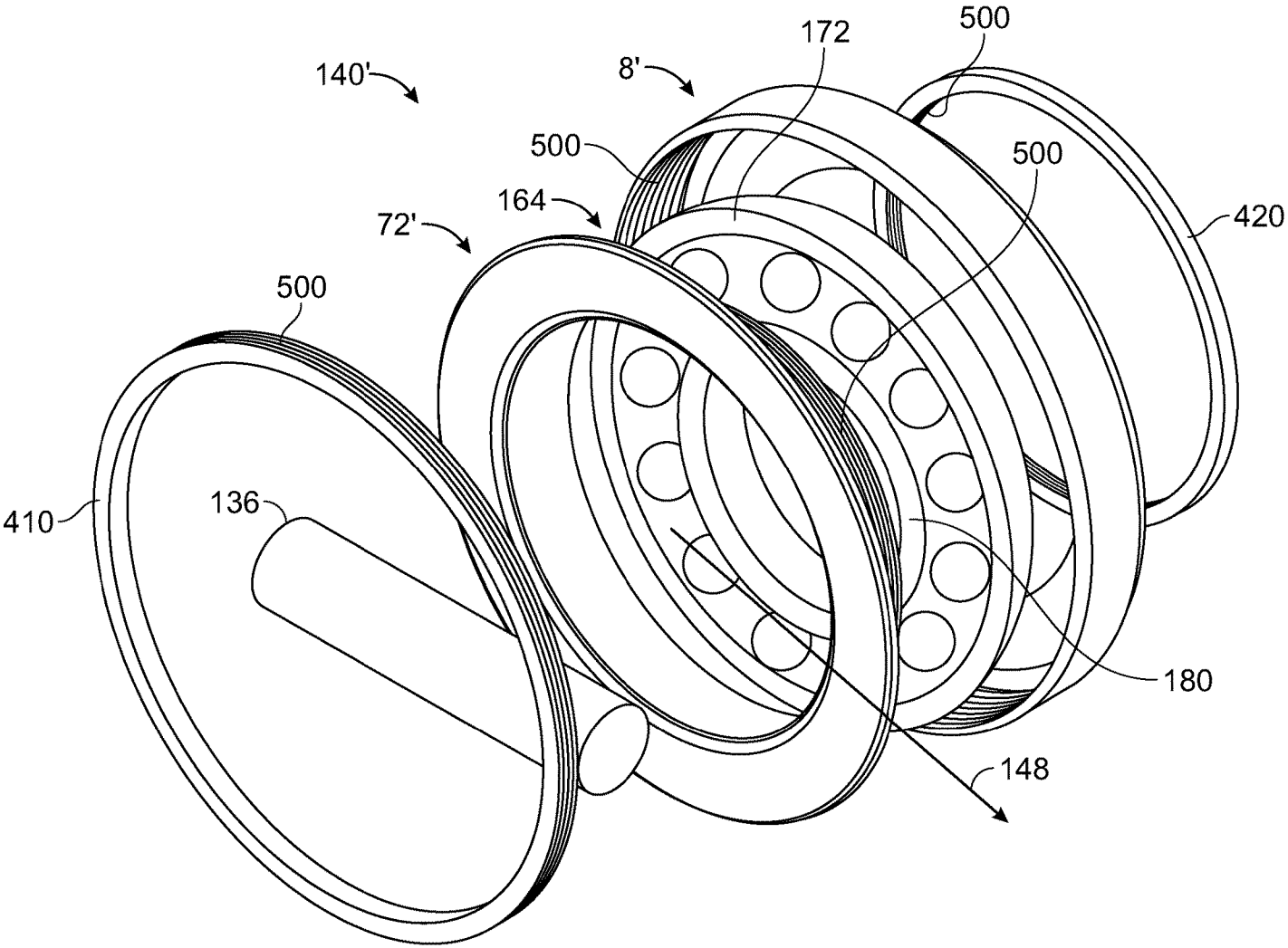
FIG. 6B illustrates a perspective exploded view of a grip apparatus according to another exemplary embodiment.

Referring now to FIG. 6B, the apparatus 140' is similar to the apparatus 140 shown in FIG. 6A, with the exception that it contains two additional components (third annular member 410 and fourth annular member 420). The third annular member 410 is dimensioned to be connected to the first annular member 8', and a fourth annular member 420 is dimensioned to be connected to the second annular member 72', The second annular member 72' and the forth annular member 420 are, when connected together, sandwiching and holding together the bearing and the first annular member 8', and wherein the third annular member 410 and the first annular member 8' are, when connected together, sandwiching and holding the second annular member 72'. For example, the first annular member 8' and the second annular member 72' can contain threads 500. The third annular member 410 and the fourth annular member 420 are also threaded (see 500). The third annular member comprises external threads 500 dimensioned to be screwed into the internal threads of the first annular member 8'. The third annular member 410 comprises external threads 500 dimensioned to be screwed into the internal threads of the first annular member 8'. The fourth annular member 420 comprises internal threads 500 dimensioned to be screwed into the external threads of the second annular member 72'.

Figure 7:
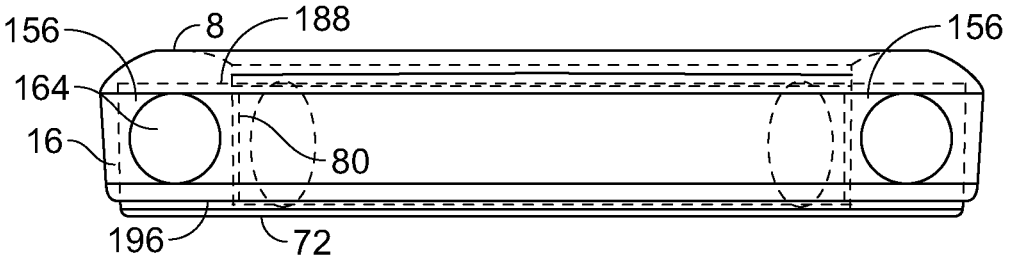
FIG. 7 illustrates a section view of a fully assembled grip apparatus according to one exemplary embodiment.

Referring now to FIG. 7, therein illustrated in a section view of a fully assembled grip apparatus 140 with the second annular member 72 inserted into the first annular member 8. The flange 24 and sidewall 16 of the first annular member 8 defines with the flange 104 and sidewall 80 of the second annular member 72 an annular chamber 156.

Referring back to FIG. 6A, the grip apparatus 140 further includes a bearing 164 positioned between the first annular member 8 and the second annular member 72. When the grip apparatus 140 is fully assembled, the bearing 164 is positioned within the annular chamber 156.

According to various exemplary embodiments, the bearing 164 may be formed other suitable materials, such as metal, steel, carbon, chromium steel, bronze, oil impregnated bronze (ex: Oilite™) or plastics. The plastics may include nylon based resins, nylon MC901, MC905, Nylatron™, graphite filled, Nyoil™ filled, UHMW copolymer types, Delrin™ acetal types, PTFE (Teflon™), and engineered plastics. Phenolic resins or wood may also be used.

For example, the bearing 164 may have sealed lubrication so as to reduce maintenance required.

The bearing 164 may be chosen from various types, such as a rolling element bearing, rotational bearing, a thrust bearing, a ball bearing, a spherical bearing, a thrust bearing, a needle bear, a cam follower, a cup and cone bearing or individual ball bearings.

The bearing 164 includes a first race and a second race being freely rotatable relative to one another. The bearing 164 is positioned between the first annular member 8 and the second annular member 72 so that the annular sidewall 16 of the first annular member 8 frictionally engages the first race. In this position, the annular sidewall 80 of the second annular member 72 frictionally engages the second race. Accordingly, the second annular member and handle member 136 is freely rotatable relative to the first annular member 8.

According to example illustrated in FIG. 6, the bearing 164 is of the rotational bearing having an outer race 172 and an inner race 180. For example, the rotational bearing is of the ball bearing type. For example, inner race 180 and outer race 172 may be made formed of carbon and chromium steel. The inner race 180 and the outer race 172 may further be induction hardened to 58 to 65 RC and precision ground.

An outer diameter of the outer race 172 substantially corresponds with an inner diameter of an inner surface 96 of the annular sidewall 16 of the first annular member 8. The diameter of the outer race 172 may correspond with the inner diameter of the annular sidewall 16 within a tolerance of approximately ±0.0015 inch. Accordingly, when the bearing 164 is positioned within the annular chamber 156, the inner surface 96 frictionally engages the outer race 172 of the bearing 164. For example, the sidewall 16 of the first annular member 8 is press fit against the outer race 172 of the bearing 164. Engagement of the outer race 172 with the sidewall 16 restricts the bearing 164 separating from the first annular member 8.

An inner diameter of the inner race 180 substantially corresponds with an outer diameter of an outer surface 88 of the annular sidewall 80 of the second annular member 72. The diameter of the inner race 180 may correspond with the outer diameter of the annular sidewall 80 within a tolerance of approximately ±0.0015 inch. Accordingly, when the bearing 164 is positioned within the annular chamber 156, the outer surface 88 frictionally engages the inner race 180 of the bearing 164. For example, the sidewall 80 of the second annular member 72 is press fit against the inner race 180 of the bearing 164. Engagement of the inner race 180 with the sidewall 72 restricts the bearing 164 separating from the first annular member 8. Furthermore, the engagement of the sidewall 16 of the first annular member 8 with the outer race 172 combined with the engagement of the sidewall 80 of the second annular member 72 with the inner race 180 restricts the first annular member 8 separating from the second annular member 72.

According to various exemplary embodiments, after positioning the second annular member 72 within the first annular member 8, the inner surface 88 of the annular sidewall 80 is swaged outwardly to promote engagement of the annular sidewall 80 with the inner race 180. The outward force on the annular sidewall 80 from the swaging may be further transmitted to the outer race 172, thereby also promoting engagement of the outer race 180 with the annular sidewall 16 of the first annular member 8.

The inner race 180 is freely rotatable relative to the outer race 172 of the bearing 164. Accordingly, when the grip apparatus 140 is fully assembled, the second annular member 72 is freely rotatable relative to the first annular member 8. Furthermore, the handle member 136 connected to the second annular member 72 is also freely rotatable relative to the first annular member 8.

According to various exemplary embodiments, the radial width of the annular flange 24 of the first annular member 8 substantially corresponds to a difference between the diameter of the inner surface 96 of the annular sidewall 16 and the diameter of the outer surface 88 of the annular sidewall 80. Similarly, the radial width of the annular flange 104 of the second annular member 72 substantially corresponds to a difference between the diameter of the inner surface 96 of the annular sidewall 16 and the diameter of the outer surface 88 of the annular sidewall 80. Accordingly, when the grip apparatus 140 is fully assembled, the bearing 164 is concealed by the flange 24, sidewall 16, flange 104 and sidewall 80 so that it is not visible from the outside.

According to various exemplary embodiments, a top wall 188 of the bearing 164 abuts against the annular flange 24 of the first annular member 8. More particularly, the top wall 188 abuts against a surface of the raised portion 40 of the annular flange 24. Furthermore, a portion of the balls of the bearing 164 may protrude past the top wall 188. This protruding portion is positioned within the space of the annular chamber 156 provided by the recessed portion 32 of the flange 24. Accordingly, the balls of the bearing 164 are disengaged from the annular flange 24 and can be rotated to allow free rotation of the inner race 180.

Similarly, a bottom wall 196 may abut against the annular flange 104 of the second annular member 72. More particularly, the top wall 196 abuts against a surface of the raised portion 120 of the annular flange 104. Furthermore a portion of the balls of the bearing 164 may protrude past the bottom wall 196. This protruding portion is positioned within the space of the annular chamber 156 provided by the recessed portion 112 of the flange 104. Accordingly, the balls of the bearing 164 are disengaged from the annular flange [014] *104* and can be rotated to allow free rotation of the inner race 180. Accordingly, the bearing 164 is positioned snugly within the annular chamber 156.

It will be appreciated that according to various exemplary embodiments where the handle member 136 is welded to the second annular member 72 and the first annular member 8, the second annular member 72 and the bearing 164 are mutually engaged through frictional engagement, the grip apparatus 140 can be assembled without the use (i.e. free of) any fastening system, such as the use of rivets, bolts and nuts, and/or screws.

According to various exemplary embodiments, an exercise equipment includes at least one grip apparatus 140 described according to various exemplary embodiments herein. The exercise equipment further includes at least one attachment member connected to the first annular member 8. The at least one attachment member is adapted to be connected to a weight system.

Referring back to FIG. 6B, the grip apparatus 140' further includes the third annular member 410 and fourth annular member 420. As indicated, above, the first annular member 8', the second annular member 72', the third annular member 410 and the fourth annular member 420 contain threads 500. The apparatus 140' mainly works as described above for apparatus 140 with the exception of the interaction of the threaded annular members 8', 72', 410 and 420. For example, the threaded portion 500 of the second annular member 72' will be inserted into the bearing 164 since the threaded portion has a diameter substantially smaller than the inner diameter of the inner race 180. The second annular member 72' will be matched with the fourth annular member 420 in view of the matching threads of each of these two members. Due to the action of these matching threads 500, bearing 164 and the first annular member 8' will be sandwiched between the second annular member and the 72' and the forth annular member 420. These components will thus be locked and held together in view of the components screwed together (72' and 420) Similarly, the matching threads 500 of the third annular member 410 and the first annular member 8' allow for sandwiching the second annular member 72', thereby holding together these three components. The external diameter of the third annular member 410 is dimensioned to be matching the internal threads 500 of the first annular member 8' and is thus smaller. Once inserted and screwed into the first annular member 8', the third annular member 410 can be flush to the top portion 44. The member 410 thus abuts the flange 104 of the member 72'. Similarly, the member 420, once screwed into member 8', can be flush to surface 64.

An inner diameter of the inner race 180 substantially corresponds with an outer diameter of an outer surface 88 of the annular sidewall 80 of the second annular member 72. The diameter of the inner race 180 may correspond with the outer diameter of the annular sidewall 80 within a tolerance of approximately ±0.0015 inch.

Figure 8:
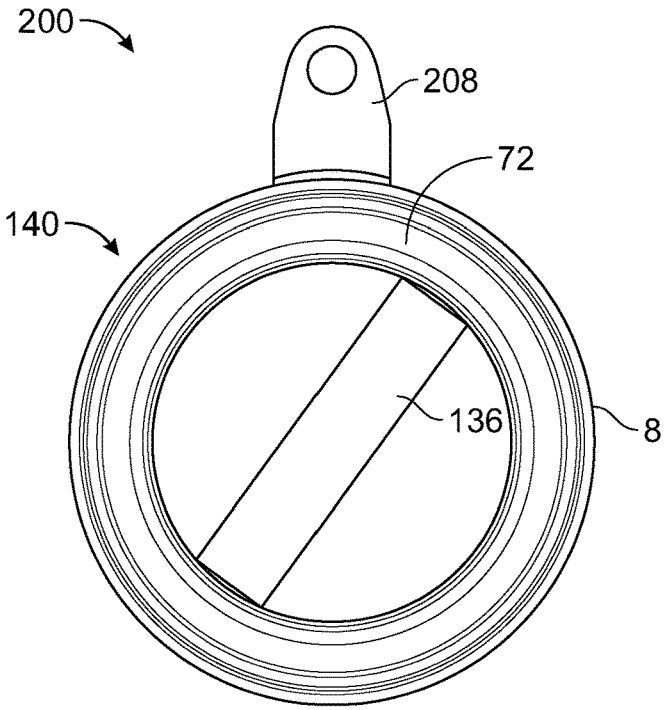
FIG. 8 illustrates an elevated front view of an exemplary stirrup handle having an exemplary grip apparatus.

Referring now to FIG. 8, therein illustrated is an elevated front view of an exercise equipment that is stirrup handle 200 according to one exemplary embodiment. An attachment member that is a loop 208 is welded to the outer surface 96 of the first annular member 8 of the grip apparatus 140. The loop 208 is adapted to be connected to a connector of a cabled weight system.

Figure 9:
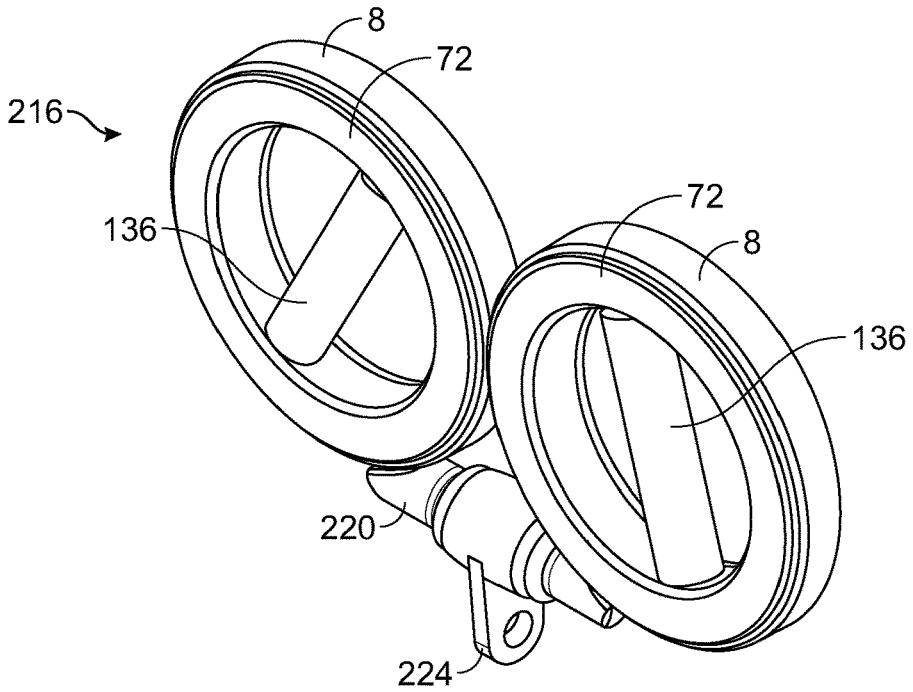
FIG. 9 illustrates a perspective view of an exemplary double stirrup handle having an exemplary grip apparatus.

Referring now to FIG. 9, therein illustrated is a perspective view of an exercise equipment that is a double stirrup handle [200] *216* according to one exemplary embodiment. An attachment member includes a cross bar 220 welded to the outer surface 96 of the first annular members 8 of two grip apparatuses 140 and a loop 224 rotatable about the cross bar 220. The loop 224 is adapted to be connected to a connector of a cabled weight system.

Figure 10:
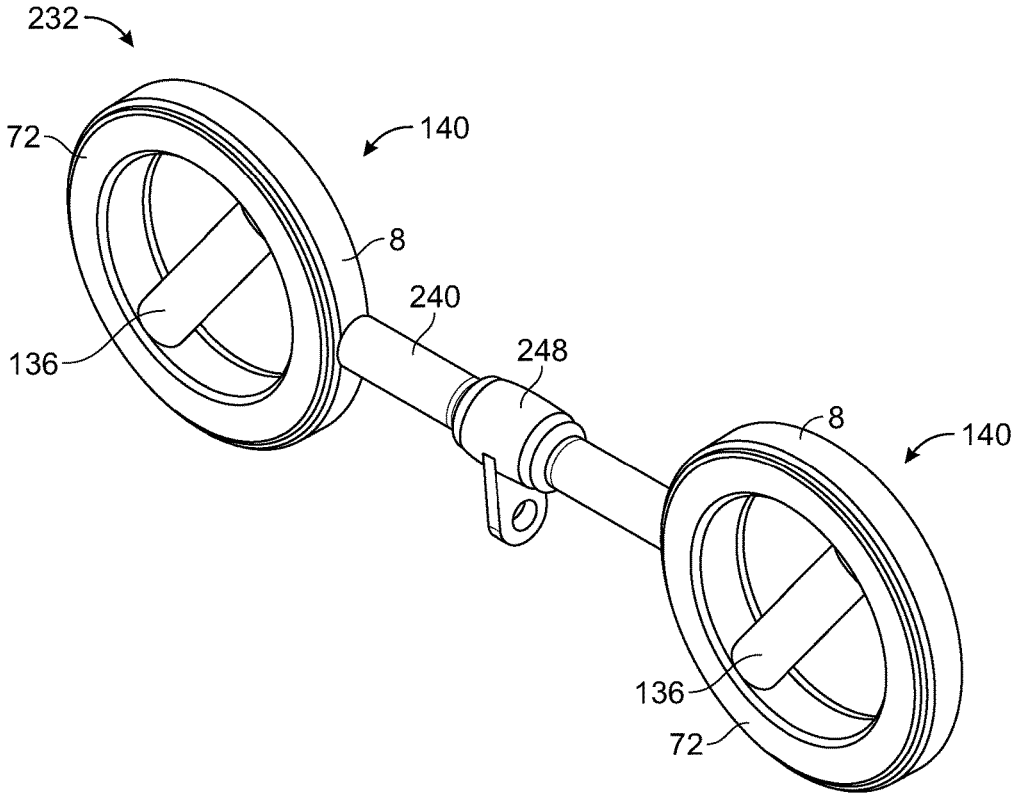
FIG. 10 illustrates a perspective view of an exemplary lat bar having an exemplary grip apparatus.

Referring now to FIG. 10, therein illustrated is a perspective view of an exercise equipment that is a lat bar or pulldown bar 232 according to one exemplary embodiment. An attachment member includes a cross bar 240 welded to and extending from the outer surface 96 of the first annular members 8 of two grip apparatus 140 and a loop 248 rotatable about the cross bar 240. The loop 248 is adapted to be connected to a connector of a cabled weight system.

Figure 11:
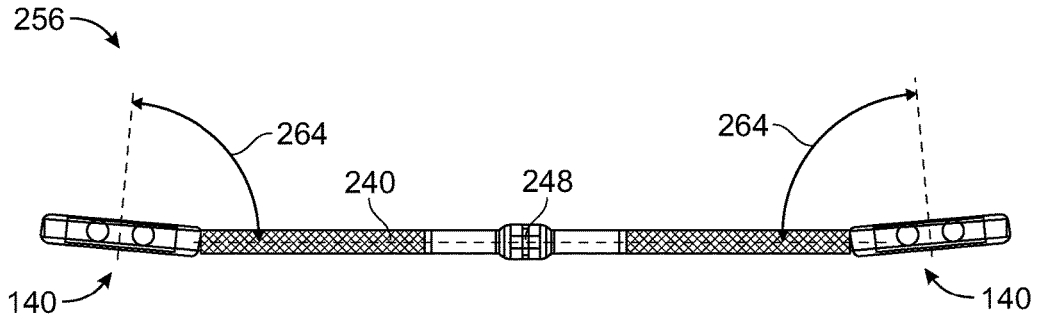
FIG. 11 illustrates a perspective view of an exemplary variant lat bar having an exemplary grip apparatus.

Referring now to FIG. 11, therein illustrated is a side elevation view of an exercise equipment that is a variant 256 of the lat bar or pulldown bar 232 illustrated in FIG. 10. The variant lat bar 256 includes a longer cross bar 240 and grip apparatuses 140 that are angled relative to the cross bar 240. For example, and as illustrated, each axis of the grip apparatuses 140 forms a 85 degree angle *264* with the cross bar 240.

Figure 12:
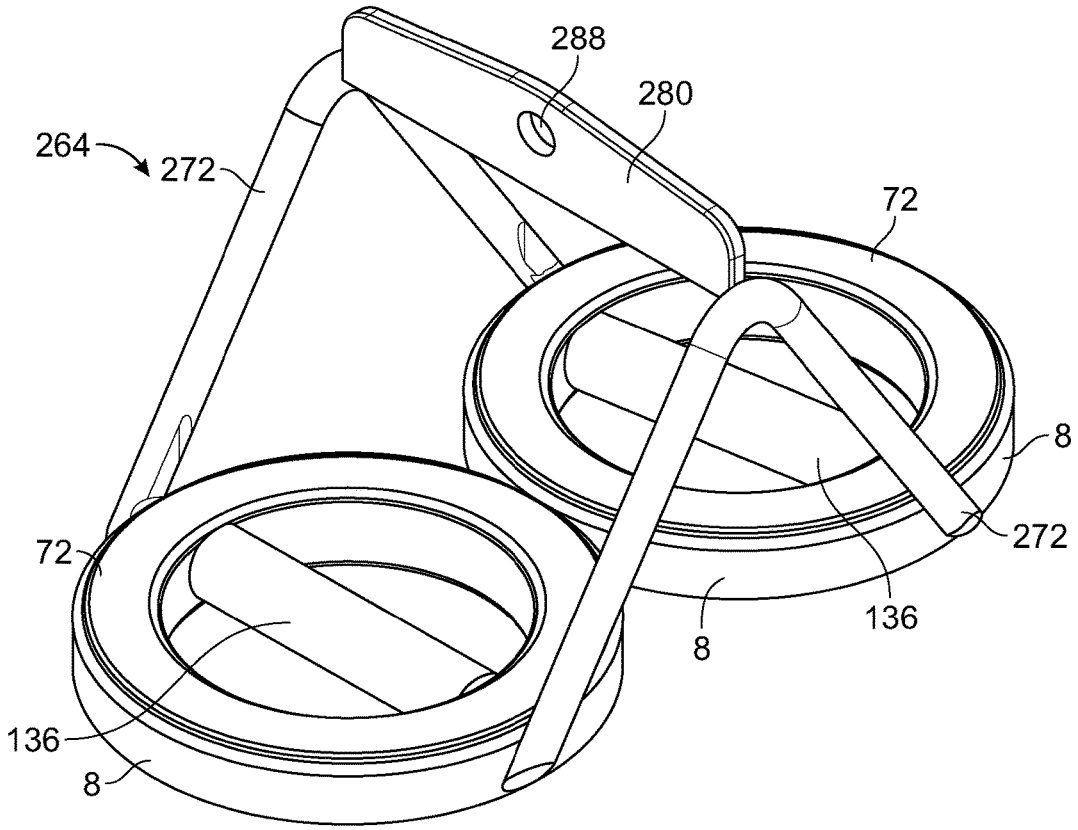
FIG. 12 illustrates a perspective view of an exemplary tricep press down bar having an exemplary grip apparatus.

Referring now to FIG. 12, therein illustrated is a perspective view of an exercise equipment that is a tricep press down bar 264. The tricep press down bar 264 includes a pair grip apparatuses 140 connected by opposing elbow members 272 welded to the outer surface 96 of the first annular members 8 of the grip apparatuses 140. An attachment member being a cross member 280 connects the two elbow members 272 and defines an opening 288. The opening 288 is adapted to be connected to a connector of a cabled weight system.

Referring now to FIG. 13, therein illustrated is a side elevation view of an exercise equipment that is an Olympic bar 296. Two grip apparatus 140 are connected by a middle bar 300 welded at its ends to the outer surface 96 of the first annular members 8 of the grip apparatuses 140. Attachment members being outwardly extending bars 304 are welded to outer portions of the first annular members 8 as shown. The extending bars 304 may each include a handle portion 308 and a weight support portion 312. The handle portions 308 may be knurled to facilitate gripping. Weight plates may be supported on the weight support portions 312.

According to various exemplary methods for manufacturing the grip apparatus 140 described herein, a first annular member 8 as described herein according to various exemplary embodiments is first provided. For example, the first annular member 8 may be formed by machining block of metal, such as low carbon steel.

A second annular member 72 as described herein according to various exemplary embodiments is also provided. For example, the first annular member 8 may be formed by machining a block of metal, such as low carbon steel.

Referring now to FIGS. 14 and 15, therein illustrated is a section view and close-up view of the section encircled by dotted lines in FIG. 14 (see FIG. 15) of an initially formed second annular member 72 according to one exemplary embodiment. The initially formed second annular member 72 corresponds to its state prior to connecting a handle member 136 (*see FIG. 6*) thereto. The initially formed second annular member 72 has an annular sidewall 80 that has an outer portion 320 and inner portion 328.

According to various exemplary methods for manufacturing the grip apparatus 140 described herein, a handle member 136 is attached to opposing portions of the second annular member 72.

Attaching the handle member 136 to the initially formed second annular member 72, for example by welding the handle member 136, may cause the outer diameter of the outer surface 88 of the annular sidewall 80 to expand outwardly. Accordingly, the method further includes machining the outer portion 320 of the annular sidewall 80 of the second annular member 72 after welding the handle member 136 thereto to reduce the outer diameter of the annular sidewall 80 such that this diameter corresponds to the inner diameter of the inner race 180 of the bearing 164 to be included in the grip apparatus. For example, after further machining the outer portion 320, the second annular member 72 may have the shape illustrated in FIG. 5.

According to various exemplary methods for manufacturing the grip apparatus 140 described herein, a bearing 164 is inserted into the first annular member 8 so that an inner surface 96 of the annular sidewall 16 of the first annular member 8 frictionally engages the outer race 172 of the bearing 164. For example, the annular sidewall 16 is press fit against the outer race 180 of the bearing 164.

Furthermore, the second annular member 72 (ex: after further machining of its outer surface 80) is inserted into the bearing 164 so that an outer surface 88 of the annular sidewall 72 of the second annular member 72 frictionally engages the inner race 180 of the bearing 164. For example, the annular sidewall 72 is press fit against the inner race 180 of the bearing 164.

According to various exemplary methods for manufacturing the grip apparatus 140 described herein, the inner surface 84 of the annular sidewall 72 of the second annular member 72 is swaged radially outwardly so as to promote engagement of the annular sidewall 72 with the inner race 180. This swaging may further promote engagement of the annular sidewall 8 with outer race 172.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The invention claimed is:

1. A grip apparatus for exercise equipment, the grip apparatus comprising:

a first annular member having a first annular sidewall and a first flange extending radially inwardly from the first annular sidewall;

a second annular member having a second annular sidewall and a second flange extending radially [inwardly] *outwardly* from the second annular sidewall, a diameter of the second annular sidewall being less than a diameter of the first annular sidewall, the second annular member being positioned within the first annular member whereby the first annular sidewall, the second annular sidewall, the first flange and the second flange define together an annular chamber;

a handle member extending between opposing portions of the second annular sidewall;

a bearing positioned within the annular chamber, the first annular sidewall frictionally engaging a first race of the bearing and the second annular sidewall frictionally engaging a second race of the bearing, whereby the second annular member is freely rotatable relative to the first annular member;

wherein the first race is an outer race of the bearing;

wherein the second race is an inner race of the bearing;

wherein an inner surface of the first annular sidewall frictionally engages an outer race of the bearing and the outer surface of the second annular sidewall frictionally engages the inner race of the bearing; and wherein the second annular member is swaged against the inner race.

2. The grip apparatus for exercise equipment of claim 1, wherein a first difference between an inner surface diameter of the inner surface of the first annular sidewall and an outer surface diameter of the outer surface of the second annular sidewall substantially corresponds to a radial width of the first flange.

3. The grip apparatus for exercise equipment of claim 2, wherein a second difference between the inner surface diameter of the inner surface of the first annular sidewall and the outer surface diameter of the outer surface of the second annular sidewall substantially corresponds to a radial width of the second flange.

4. The grip apparatus for exercise equipment of claim 3, wherein a top wall of the bearing abuts against the first flange of the first annular member.

5. The grip apparatus for exercise equipment of claim 4, wherein the first flange has an annular recessed portion for accommodating portions of balls of the bearing protruding from the top wall of the bearing.

6. The grip apparatus for exercise equipment of claim 5, wherein the second flange has an annular recessed portion for accommodating portions of the balls of the bearing protruding from the bottom wall of the bearing.

7. The grip apparatus for exercise equipment of claim 4, wherein a bottom wall of the bearing abuts against the second flange of the second annular member.

8. The grip apparatus for exercise equipment of claim 1, further comprising a third annular member dimensioned to be connected to the first annular member, and a fourth annular member dimensioned to be connected to the second annular member, wherein the second annular member and the fourth annular member are, when connected together, sandwiching and holding together the bearing and the first annular member, and wherein the third annular member and the first annular member are, when connected together, sandwiching and holding the second annular member.

9. The grip apparatus for exercise equipment of claim 1, further comprising a third annular member comprising external threads dimensioned to be matched with internal threads of the first annular member, and a fourth annular member comprising internal threads dimensioned to be matched with external threads of the second annular member, wherein the second annular member and the fourth annular member are, when connected together, effective for sandwiching and holding together the bearing and the first annular member, and wherein the third annular member and the first annular member are, when connected together, effective for sandwiching and holding the second annular member.

10. A grip apparatus for exercise equipment, the grip apparatus comprising:

a first annular member having a first annular sidewall and a first flange extending radially inwardly from the first annular sidewall;

a second annular member having a second annular sidewall and a second flange extending radially [inwardly] *outwardly* from the second annular sidewall, a diameter of the second annular sidewall being less than a diameter of the first annular sidewall, the second annular member being positioned within the first annular member whereby the first annular sidewall, the second annular sidewall, the first flange and the second flange define together an annular chamber;

a handle member extending between opposing portions of the second annular sidewall;

a bearing positioned within the annular chamber, the first annular sidewall frictionally engaging a first race of the bearing and the second annular sidewall frictionally engaging a second race of the bearing, whereby the second annular member is freely rotatable relative to the first annular member; and a third annular member dimensioned to be connected to the first annular member, and a fourth annular member dimensioned to be connected to the second annular member, wherein the second annular member and the fourth annular member are, when connected together, sandwiching and holding together the bearing and the first annular member, and wherein the third annular member and the first annular member are, when connected together, sandwiching and holding the second annular member.

11. The grip apparatus for exercise equipment of claim 10, wherein the first race is an outer race of the bearing;

wherein the second race is an inner race of the bearing; and wherein an inner surface of the first annular sidewall frictionally engages the outer race of the bearing and an outer surface of the second annular sidewall frictionally engages the inner race of the bearing.

12. The grip apparatus for exercise equipment of claim 11, wherein the inner surface of the first annular sidewall is press fit against the outer race of the bearing.

13. The grip apparatus for exercise equipment of claim 12, wherein an outer surface of the second annular sidewall is press fit against the inner race of the bearing.

14. The grip apparatus for exercise equipment of claim 11, wherein the second annular member is swaged against the inner race.

15. The grip apparatus for exercise equipment of claim 10, wherein the grip apparatus for exercise equipment is free of fastening systems for attaching the first annular member to the second annular member.

16. The grip apparatus for exercise equipment of claim 10, wherein the bearing is a ball bearing.

17. The grip apparatus for exercise equipment of claim 10, wherein the bearing is chosen from a rolling element bearing, rotational bearing, a thrust bearing, a ball bearing, a spherical bearing, a thrust bearing, a needle bearing, a cam follower, a cup and cone bearing (timkin) and individual ball bearings.

18. Exercise equipment comprising:

at least one grip apparatus for exercise equipment according to claim 10; and one attachment member connected to the first annular member and adapted to be connected to a weight system.

19. The exercise equipment of claim 18, wherein the exercise equipment is chosen from a chinning triangle, a tricep press down, a lat bar, a stirrup handle, a pulldown bar, a curl bar, an Olympic bar, a dumbbell handle, a hex bar, and a tricep bar.

20. A method for manufacturing a grip apparatus for exercise equipment, the method comprising:

providing a first annular member having a first annular sidewall and a first flange extending radially inwardly from the first annular sidewall;

providing a second annular member having a second annular sidewall and a second flange extending radially [inwardly] *outwardly* from the second annular sidewall, a diameter of the second annular sidewall being less than a diameter of the first annular sidewall;

attaching a handle member to opposing portions of the second annular sidewall;

inserting a bearing into the first annular member, whereby an inner surface of the first annular sidewall frictionally engages an outer race of the bearing;

inserting the second annular member into the bearing, whereby an outer surface of the second annular sidewall frictionally engages an inner race of the bearing; and swaging the inner surface of the second sidewall of the second annular member outwardly radially.

* * * * *